United States Patent
Crimmins et al.

(10) Patent No.: US 7,059,342 B2
(45) Date of Patent: Jun. 13, 2006

(54) LIQUID SHUT-OFF SYSTEM

(75) Inventors: James Jerome Crimmins, 2824 Nicolet Dr., Green Bay, WI (US) 54311; Robert Alan Vlies, Algoma, WI (US)

(73) Assignee: James Jerome Crimmins, Green Bay, WI (US)

( * ) Notice: Subject to any disclaimer, the term of this patent is extended or adjusted under 35 U.S.C. 154(b) by 257 days.

(21) Appl. No.: 10/378,259

(22) Filed: Mar. 4, 2003

(65) Prior Publication Data

US 2004/0173260 A1 Sep. 9, 2004

(51) Int. Cl.
*F16K 31/22* (2006.01)
*F16K 31/24* (2006.01)
*F16K 31/32* (2006.01)
*F16K 33/00* (2006.01)

(52) U.S. Cl. ............ 137/428; 4/669; 4/671; 4/674; 73/322.5; 137/426; 137/433

(58) Field of Classification Search ............ 4/508, 4/538, 673, 674, 679, 680, 682, 686, 541.2, 4/541.3, 669, 671, 672, 675, 683; 137/426, 137/433, 428, 429, 430; 73/322.5
See application file for complete search history.

(56) References Cited

U.S. PATENT DOCUMENTS

| | | | | | |
|---|---|---|---|---|---|
| 1,214,212 | A | * | 1/1917 | Newton | 137/429 |
| 1,233,654 | A | * | 7/1917 | Dziatkiewicz | 4/669 |
| 1,744,073 | A | * | 1/1930 | Gordon et al. | 4/669 |
| 2,739,939 | A | * | 3/1956 | Leslie | 137/428 |
| 2,809,752 | A | * | 10/1957 | Leslie | 137/428 |
| 3,391,411 | A | * | 7/1968 | Miller | 4/669 |
| 3,553,740 | A | * | 1/1971 | Fogg | 137/428 |
| 3,739,405 | A | * | 6/1973 | Schmidt | 137/428 |
| 3,894,555 | A | * | 7/1975 | Payne | 137/429 |
| 3,908,206 | A | * | 9/1975 | Grewing | 137/428 |
| 4,180,095 | A | * | 12/1979 | Woolley et al. | 137/429 |
| 4,735,230 | A | * | 4/1988 | Detloff | 137/428 |
| 4,836,239 | A | * | 6/1989 | Kinkead | 137/428 |
| 4,903,724 | A | * | 2/1990 | Simard | 137/428 |

* cited by examiner

*Primary Examiner*—George L. Walton

(57) ABSTRACT

An automatic liquid shut-off system for a vessel and having a valve in a liquid passageway to control the level of liquid in the vessel so as to prevent an overflow of the liquid. The shut-off system comprises a conduit extending exterior from one wall of the vessel and in liquid communication therewith. A float is disposed in the conduit, and a stem extends from the float co-axially with the conduit, and is affixed to the valve to actuate the valve to a closed position. When the liquid level in the vessel rises to an undesired level, and the liquid in the vessel therefore reaches a level approximately the level of the float, the liquid acting upon the float will actuate the valve to a closed position, thereby shutting off the liquid.

4 Claims, 4 Drawing Sheets

LIQUID SHUT-OFF SYSTEM

FIELD OF THE INVENTION

This invention relates to a liquid shut-off valve system. In its more specific aspect, this invention relates to a liquid shut-off valve system for a vessel for preventing the overflow of liquid.

BACKGROUND OF THE INVENTION AND PRIOR ART

A persistent problem with one using a vessel, e.g. bath tub, is the overflow of water or other liquid. For example, it is not uncommon for a bather to inadvertently or accidentally let the tub overflow. While filling the tub with water in preparation for a bath, the bather might be distracted or called to another room, or the bather might be incapacitated, and unbeknownst to anyone, the water continues to fill the tub and soon overflows onto the floor. As a consequence, the overflow can be damaging to the floor and furniture not only in the bath room, but in adjacent rooms or rooms on a lower level. This problem occurs not only in the home, but in health-care facilities and all too frequently in hotels and motels. This overflow problem also occurs on farms where a vessel used for livestock is filled with water, and the farmer can be distracted and the vessel overflows. Thus, this problem is relatively prevalent in many circumstances utilizing vessels filled with a liquid.

A number of shut-off systems have been proposed and are shown in the prior art. These systems tend to be unduly complicated and expensive, and frequently incorporate electrical components in the system. Also, many of these systems cannot be retrofit to an existing system. For example, U.S. Pat. No. 2,877,467 utilizes a solenoid, and U.S. Pat. No. 4,258,444 incorporates a proximity switch.

This invention has therefore as its purpose to provide a liquid shut-off system to control the liquid level in a vessel such as a bath tub.

It is another object of my invention to provide a liquid shut-off system that can be readily retrofit to a vessel such as a bathtub, utilizes no electrical components, and is relatively inexpensive and easy to install.

SUMMARY OF THE INVENTION

Broadly, the invention is to an automatic liquid shut-off system for a vessel, e.g. bath tub, and having a valve in a liquid passageway disposed exterior to the vessel to control the level of liquid in the tub so as to prevent an overflow of the liquid. The shut-off system comprises a conduit, duct, or the like, extending exteriorly from one wall of the vessel and in liquid communication with the vessel. A float is disposed in the conduit, and a rigid stem extends from the float co-axially with the conduit, and is affixed to the valve to actuate the valve to a closed position. Thus, when the liquid level in the vessel rises to a predetermined level or to an undesired level, and the liquid in the vessel and in the conduit therefore reach a level approximately the level of the float, the liquid will raise or act upon the float which in turn will actuate the valve to a closed position.

The term "vessel" as used herein and in the appended claims is intended to include tub, bathtub, tank, basin, reservoir, and the like.

Many bath tubs are provided with an overflow outlet that is in fluid communication with or opens to the drain, which most typically cannot drain sufficient water from the tub at the same rate as the ingress of water, and therefore is inadequate to prevent an overflow. Furthermore, these outlets have a tendency to become clogged with hair and other debris. In accordance with my invention, the conduit with the float can be extended from the overflow outlet. This arrangement is particularly desirable for retrofitting a tub with my shut-off system. Where desired, especially for new construction, the conduit may open near the bottom of the vessel, and extend upwardly to the shut-off valve.

DETAILED DESCRIPTION OF THE INVENTION AND PREFERRED EMBODIMENT

Figure 1:
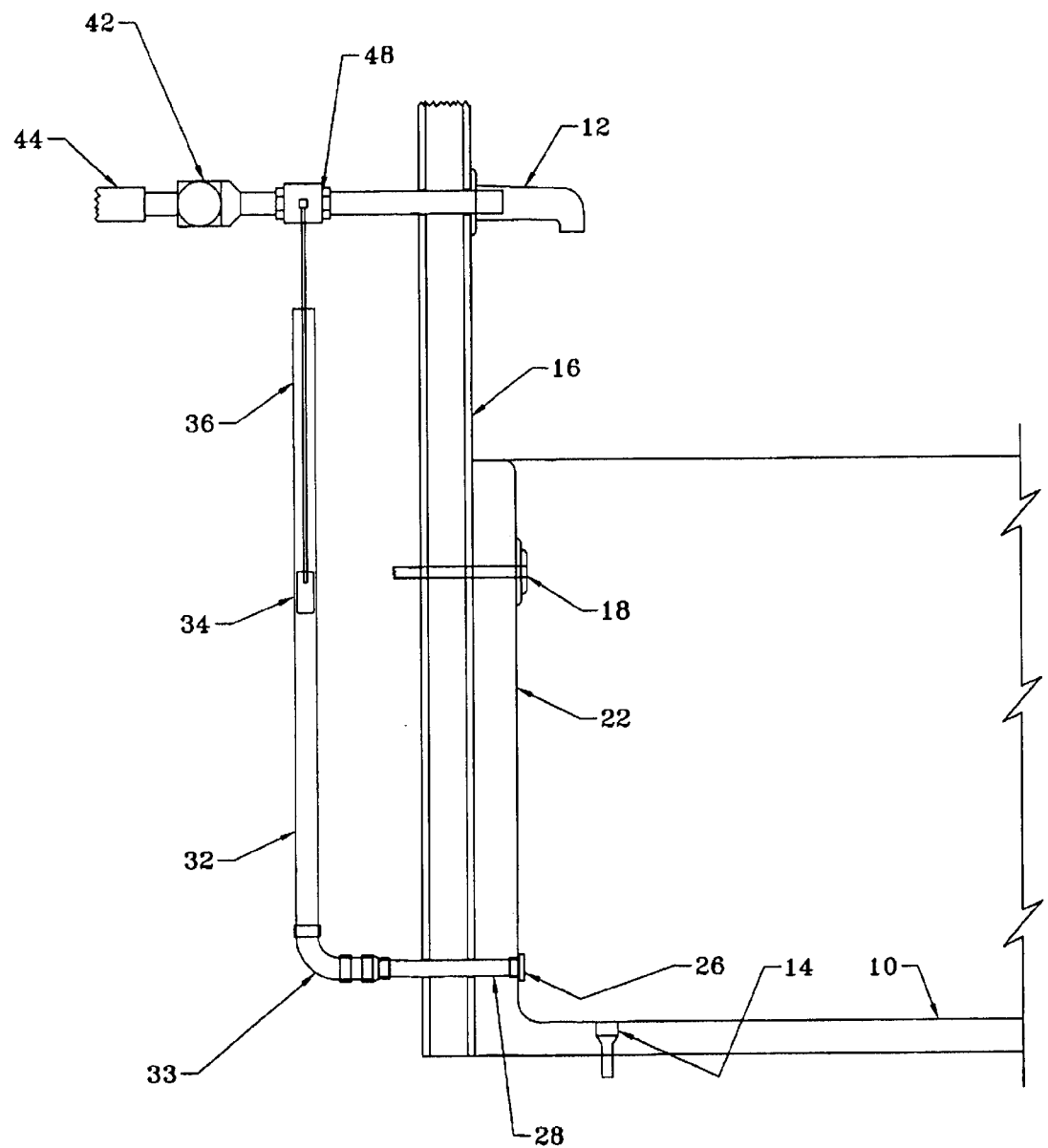
FIG. 1 is an elevational view, in fragmentary cross-section, of a typical bath tub having installed a shut-off valve of the present invention.
Figure 2:
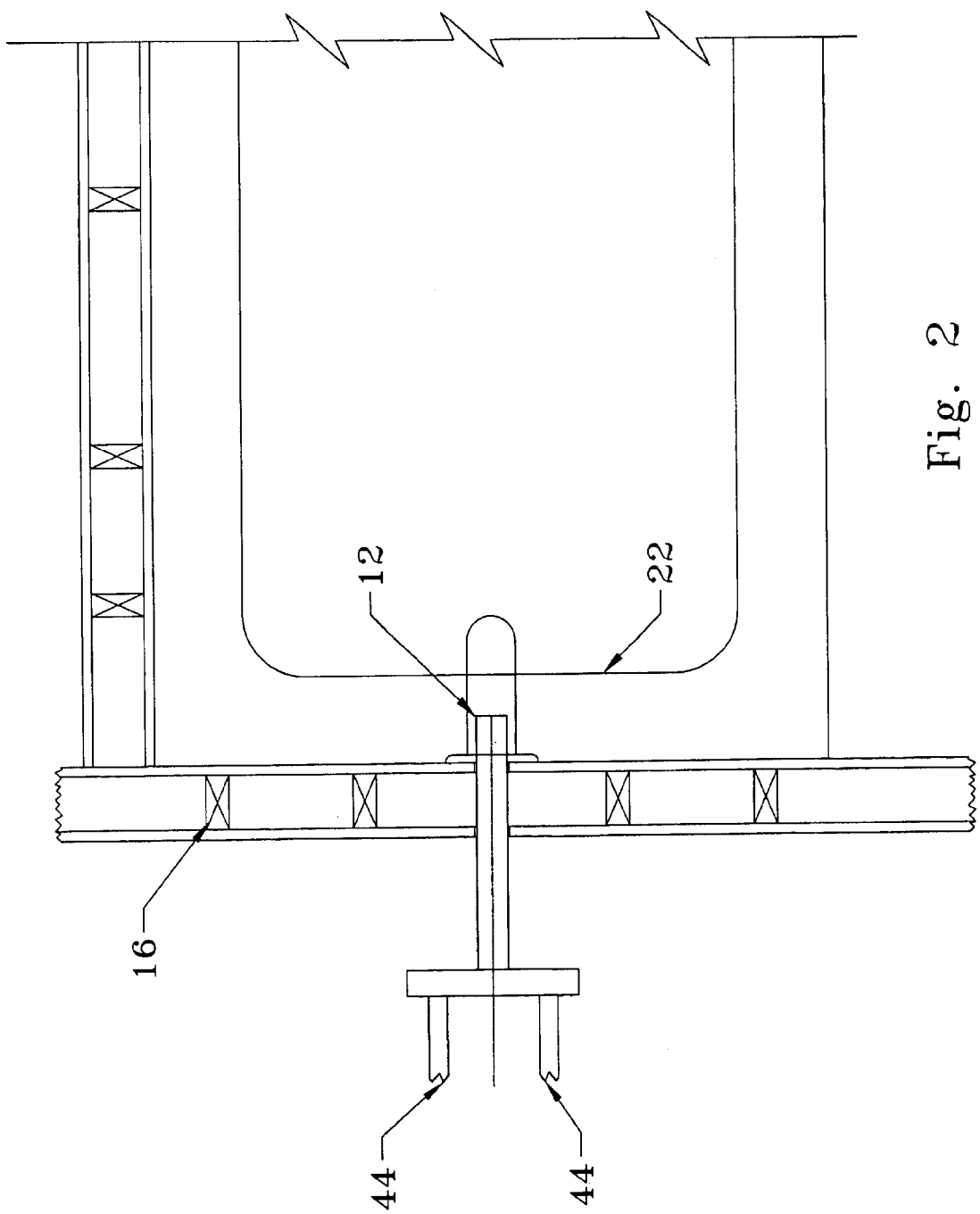
FIG. 2 is a plan view section of the present invention.
Figure 3:
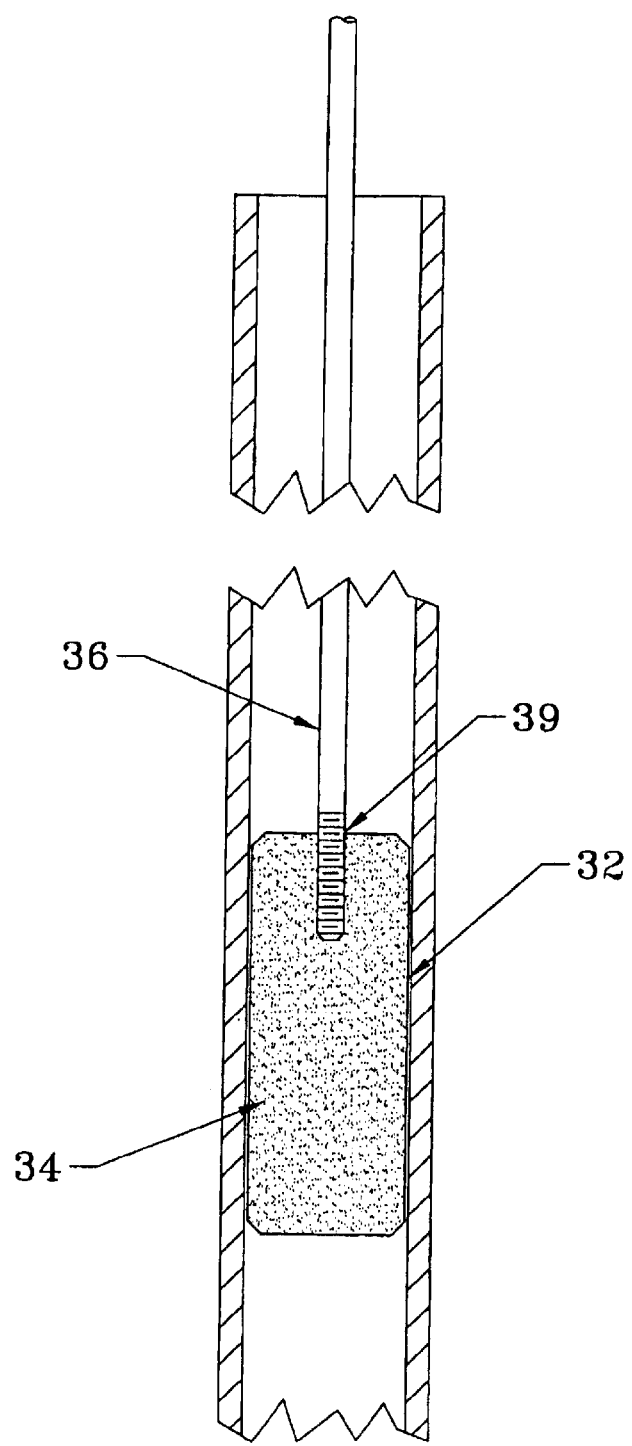
FIG. 3 is an enlarged elevational view, in fragmentary cross-section, showing the float and connection to the valve.

Referring to the drawings, wherein the same reference numerals refer to similar parts throughout the several views, there is shown in FIG. 1 a bath tub, indicated generally by the numeral 10 and shown in fragmentary. Although the invention is described in detail as it pertains to a bathtub and filled with water, it should be understood that the invention is applicable to other vessels, and vessels filled with other liquids. The bathtub 10 includes a spigot or faucet 12 and a drain 14. It is somewhat typical for a bath tub to be set against a wall 16 to conceal the piping, but frequently a tub is set out in the open. In either case, the present invention is equally applicable. The bath tub may be provided with an overflow outlet 18, which is not necessary for purposes of this invention, but can provide easy access for retrofitting the shut-off system, as explained below in detail.

Figure 4:
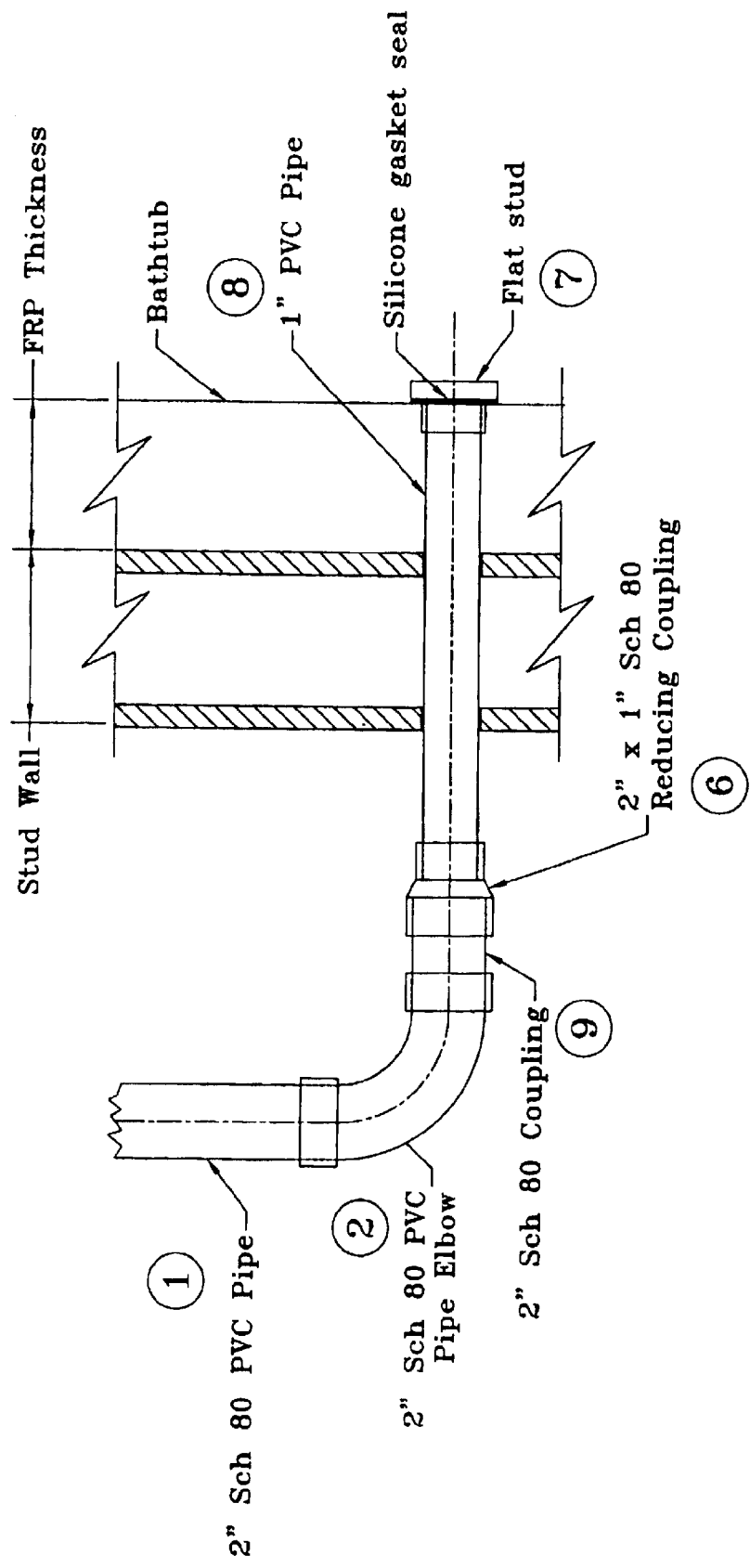
FIG. 4 is a detailed view of the correction between cylindrical chamber and the fluid opening of the reservoir tank of the invention.

As shown in FIG. 1, the tub 10 typically has side walls adjoining the bottom with an arcuate configuration to facilitate cleaning and draining. Bath tubs are almost always oblong, and the narrow forward wall 22 is disposed adjacent the room wall 16, and the faucet and certain of the plumbing may be extended from the tub or from the room wall. Adjacent or above the arcuate configuration in wall 22 of the tub there is an opening 26 to accommodate horizontal conduit, duct, pipe, etc., 28 which opens to the tub as depicted in FIG. 4. It should be understood that the conduits useful for this invention may be metal (e.g. copper) or plastic (e.g. polyvinyl chloride). The room wall 16 is supported by a plurality of studs (e.g. 2×4 wooden studs), and it may be beneficial to provide a suitable bracket 30 attached to the stud to support the conduit 28. Where desired, a stud may be provided with a transverse hole (not shown), and the conduit 28 passed through the hole for support. The vertical or branch cylindrical chamber or conduit 32 is connected to conduit 28 as with an elbow or the like 33, and is disposed substantially perpendicular thereto. The conduit 32 is vertically disposed and is of sufficient length so that the top exceeds the level of water within the tub rising above a predetermined level.

The conduit 32 is provided with afloat 34 having an upward extending rigid Stem. 36 disposed co-axially with die conduit. The float should be of a durable material and having a low coefficient of friction, and I have found that polypropylene a desirable material. The stem 36 may be integral with the float 34 or the stem may be a separate rod or linking arm attached to the top of the float by threaded connection 39 or any suitable means. The opposite end of the stem 36 is provided with connecting means as threaded connection for attachment to the shut off valve.

A liquid passageway or pipe 38 directing water to the faucet 12 extends back to a water manifold 42 having a water line 44 for hot water and for cold water, and an open/closed valve 46 for controlling the water to the faucet. The faucet has an open and closed position, and is adjustable between hot and cold water to adjust for the desired temperature of the water. The float stem 36 is affixed to the valve 46, and when the float rises in the conduit 32 by reason of water entering the conduit, the float actuates the valve 46 to a closed position, thereby shutting off the water and preventing an overflow.

Thus, as water begins to fill the tub and reaches the level of conduit 28, water will rise in branch conduit 32. When the water reaches the level of the float 34, the buoyancy will cause the float to rise in the conduit causing the stem to actuate the open/closed valve 46 and thereby shutting off the water.

The liquid shut-off system of the invention can be retrofit to an existing vessel having an overflow outlet. Thus, the conduit 28, with elbow 34 may be connected to branched conduit 32 having the float 34 position therein. It will be observed that the conduit connections and stem 36 are much shorter than a system extending from near the bottom of the tub. However, the performance of the system is essentially the same as described above. Similarly, the shut-off system of the invention can be installed in a shower stall having low ledge, riser or upright, which therefore would utilize relatively short pipe connections.

It will be observed that the liquid shut-off system of the invention provides for several advantages, including the fact that the system is automatic and prevents overflow, is not complicated to install and requires no special or unusual skill. In addition, the system is useful for most any vessel and of most configurations, and can be retrofit to most vessels. Also, the system is mechanical, and therefore failure is exceedingly rare. Further, it should be understood that the foregoing detailed description has been given for clearness of understanding only, and no unnecessary limitations should be understood therefrom, as modifications will be obvious to those skilled in the art.

Having described the invention and certain embodiments thereof, we claim:

1. A liquid level control system for automatically stopping the flow of a liquid fluid coming from a supply conduit or manifold, into a reservoir tank when a level of fluid in the reservoir tank has reached a predetermined height in the reservoir tank, said liquid level control system comprising:

a vertical cylindrical chamber adjacently located behind a wall of said reservoir tank and hydraulically associated with said reservoir tank so that said level of fluid in said reservoir tank corresponds to a level of fluid in said vertical cylindrical chamber;

a kinematic level control mechanism containing a float and an adjustable rigid link, and adapted to slide inside the vertical cylindrical chamber due to the fluid level change therein, said float secured to said portion of a float, said kinematic level control mechanics being adapted to be vertically actuated when said level of fluid in said vertical cylindrical chamber reaches a predetermined level; and, a flow control means positioned adjacent the outlet of said supply conduit or manifold and adapted to stop the flow of fluid coming from said supply conduit or manifold into said reservoir tank when said fluid within said cylindrical chamber has reached said predetermined level.

said reservoir lank, has a bottom drain, along with an overflow, placed higher in said reservoir tank, then said reservoir tank, said liquid in said reservoir tank moves through the said liquid level conduit just above the bottom drain of said reservoir tank and fills said liquid level conduit from the bottom up which raises said float, which in turn moved said adjustable rigid link up to activate said manifold.

2. A liquid kinematic level control system as recited in claim 1, said link comprising a rod having on end mounted to a surface of said float, the other end of said rod connected to said flow control means.

3. A liquid level control system as recited in claims 1, said flow control means comprises a positive on/off valve adapted to close the inlet of said reservoir tank, due to the position of said float within said cylindrical chamber when said predetermined level therein has been reached.

4. A liquid level control system as recited in claim 1, said cylindrical chamber, with vertical pressure from said reservoir tank, which applies pressure to said float, which moves said float vertically up/down which the moves said link arms up/down to establish a positive on/off position of said flow control means.

* * * * *